Sept. 24, 1929.          E. O. BENNETT          1,729,473
                       MOVABLE DITCH LIGHT
                       Filed Oct. 22, 1926          3 Sheets-Sheet 1
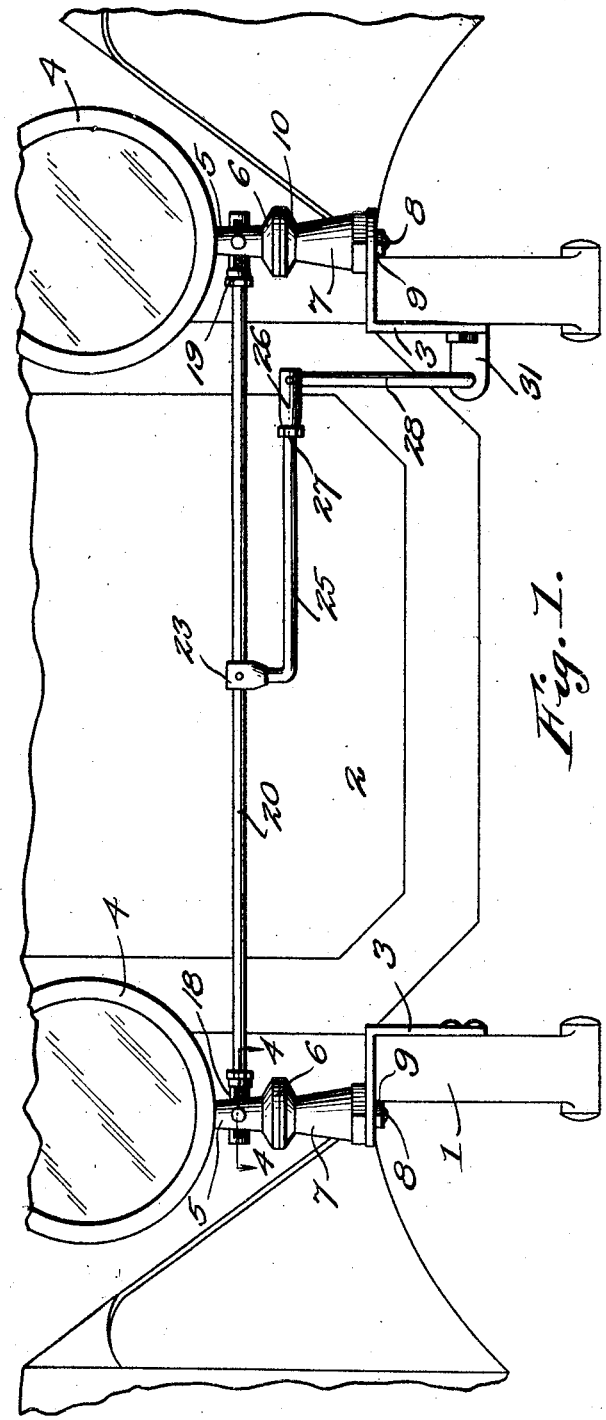
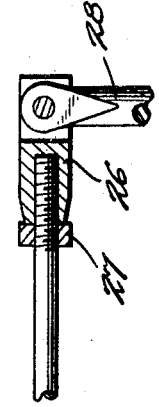
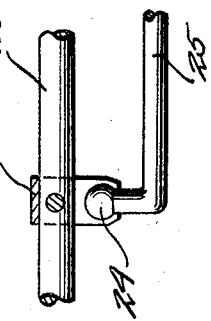
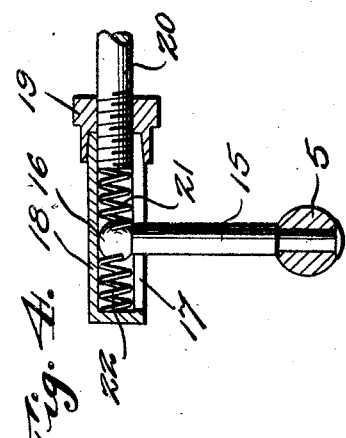
Ernest O. Bennett
INVENTOR Sept. 24, 1929.   E. O. BENNETT   1,729,473
MOVABLE DITCH LIGHT
Filed Oct. 22, 1926   3 Sheets-Sheet 2
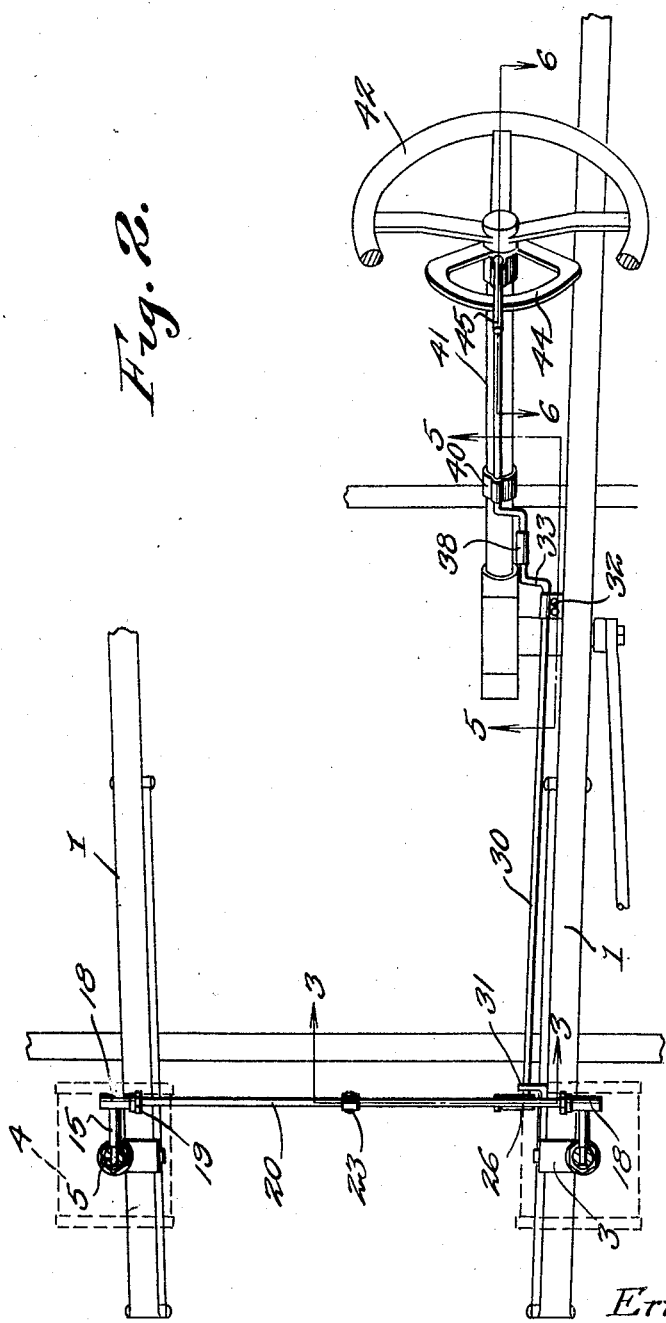
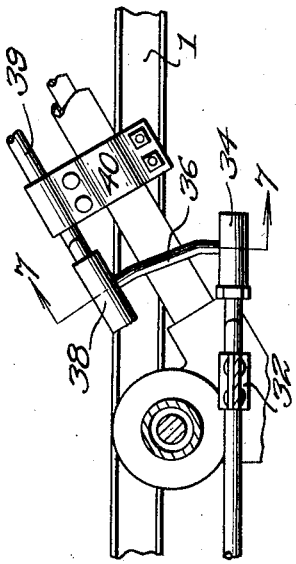
Ernest O. Bennett
INVENTOR

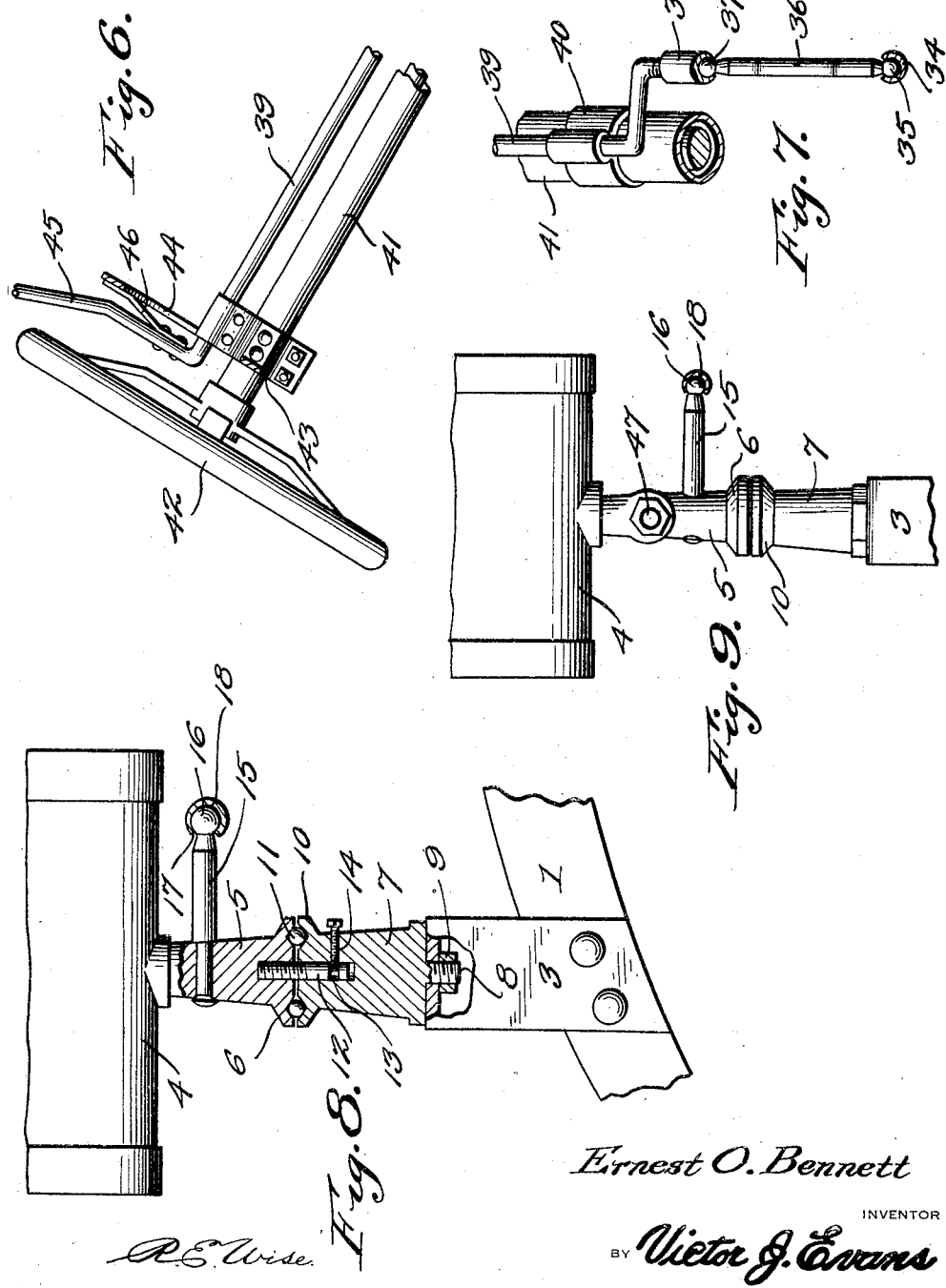

Patented Sept. 24, 1929

1,729,473

UNITED STATES PATENT OFFICE

ERNEST O. BENNETT, OF BLUEFIELD, WEST VIRGINIA

MOVABLE DITCH LIGHT

Application filed October 22, 1926. Serial No. 143,462.

My present invention has reference to spot lights for motor operated vehicles and more particularly to a novel construction of means for simultaneously turning the lights in either direction to maintain the light rays directly in advance to vehicles especially when turning curves or the like and upon approaching the rays of lights from other machines the spot lights may be turned so that the driver will observe road conditions without necessitating the changing of the main driving lights.

A further object is the provision of a device of this character in which spot lights, or as a matter-of-fact headlights of vehicles may be turned to direct the rays of light therefrom away from approaching vehicles as well as to observe road conditions to the sides of the vehicle and in which the said lamps are turned by the operation of a lever arranged in juxtaposition to the steering wheel, making it unnecessary for the driver to remove his hands from the wheel in order to turn the lamps or dim the headlights.

To the attainment of the above broadly stated objects and many others which will present themselves as the nature of the invention is better understood, the improvement further resides in certain other novel features of construction, combination and operative association of parts, a satisfactory embodiment of which is disclosed by the accompanying drawings.

In the drawings:—

Figure 1 is a front elevation of a vehicle equipped with the improvement.

Figure 2 is a top plan view showing the arrangement of the improvement on the frame of the vehicle.

Figure 3 is a sectional view approximately on the line 3—3 of Figure 2.

Figure 4 is a sectional view approximately on the line 4—4 of Figure 1.

Figure 5 is a sectional view approximately on the line 5—5 of Figure 2.

Figure 6 is a sectional view approximately on the line 6—6 of Figure 2.

Figure 7 is a sectional view approximately on the line 7—7 of Figure 5.

Figure 8 is a detail elevation of one of the lamp housings and the support therefor, parts being in section.

Figure 9 is a detail side elevation showing the manner in which the lamp housing may be pivotally and therefore adjustably secured to the support therefor.

In carrying out my invention I secure to the side members 1 of the frame of an automobile 2, adjacent to the forward ends thereof, angle brackets 3. The vertical arms of these brackets are fixed to the inner sides of the frame and the horizontal arms thereof are disposed over the top of the frame members. On the said horizontal arm of each bracket 3, I fix a support for a lamp housing 4. The housings 4 may be of the drum formation as disclosed by the drawings or the same may be in the nature of spot lamps and these lamps are employed in addition to the ordinary headlamps, the said lamps 4 being located below the headlamps. I have not deemed it necessary to illustrate the main headlamps or the posts therefor.

Each of the supporting elements or posts for the lamp housings 4 comprises two sections, the upper element 5 of which being fixed to the lamp housing, and which has its lower or outer end formed with a flange or enlargement 6. The second element 7 of the post is bolted to the horizontal flange of the bracket 3, the base of the said element 7 being preferably and integrally formed with a bolt extension 8 that is engaged by a nut 9. The element or section 7 has its top outwardly flanged, as at 10, and the flanges 5 and 6 have continuous aligning grooves in the confronting faces thereof that provide a race-way for anti-frictional balls 11. The upper element or section 5 of the lamp support or post is centrally formed with a stud extension 12 provided with a round continuous depression 13 that receives therein one end of a bolt member 14 that is screwed through the lower element or section 7.

The upper elements or members 5 of each of the lamp supports or posts has fixed thereto a rearwardly extending rod 15 that terminates in a ball head 16. The ball heads are received through slots 17 in the sides of sleeves 18. The outer end of each sleeve is closed and the inner and open end has screwed thereon a cap nut 19. Screwed in the cap nuts 19 are the ends of a rod 20 that thus connects the lamp posts. Between the inner ends of the rods 20 there are arranged in the sleeves 18 helical springs 21 that contact with the head ends of the rods and with one of the sides of the ball head on each of the short rods 15. Also arranged in the bore of each sleeve 18 and contacting the opposite side of the ball head of the said short rods and the closed ends of the sleeves 18 there are similar springs 22.

Approximately centrally fixed on the connecting rod 20 there is a clamp member 23, the same being preferably constructed in two sections or the same may be slitted so that the lower portion thereof is formed with a socket for a ball head 24 on the offset end of a rod 25. Screwed on the outer or free end of the rod 25 there is the socket end of a clevis or like joint member 26, a lock nut 27 being also screwed on the rod and contacting the end of the clevis. The outer or bifurcated end of the clevis has pivotally secured therein the offset end 28 of the motion transmitting rod 30. The rod 30 is journaled through a suitable bearing 31 on the sides of the frame member 1, adjacent to the brackets 3, and this bearing may be integrally formed with one of said brackets. The rod extends rearwardly parallel with the side member 1 of the frame which is adjacent to the said rod and the rod 30 finds one or more additional bearings 32 that are fixed on the inner face of the said side member 1 of the frame. The rear or free end of the rod 30 is cranked, as at 33, and the outer straight portion of the crank 33 carries a socket 34 for the ball head 35 on one end of a link 36. The second end of the link is also provided with a ball head 37 that is received in a socket member 38 in which is screwed the cranked or offset end of a second rod 39 that forms an extension of the rod 30. The last mentioned rod 39 is journaled in bearings, preferably formed on clips 40 arranged around and secured to the steering post column 41 of the automobile 2. For distinction the steering wheel of the automobile is indicated by the numeral 42, and beneath the steering wheel and clamped on the column 41 there is a bracket 43 that also provides a bearing for the rod 39. In addition to this the bracket 43 has secured thereon a segmental plate 44. The end of the rod passes through the bearing and the bracket 43 is bent angularly to provide the same with a handle portion 45 and fixed on the under face of the said handle portion there is one end of an arched spring 46 whose outer or free end frictionally engages with the segmental plate 44. The handle 45 it will be noted is arranged under the steering wheel 42, but the same projects beyond the periphery of the steering wheel so that the said handle may be readily grasped by the driver of the machine and turned to turn the rod 39, which, through the instrumentality of the link 36, will impart a like turning to the rod 30. The turning of the rod 30 causes its offset end 28 to swing and exert a pull or push upon the rod 25, which in turn imparts a longitudinal movement to the lamp post connecting rod 20, so that the upper section or member 5 of each of the lamp posts will be turned on the lower sections or members thereof, thus swinging the lamp housings 4 to any horizontal angular position with respect to the vehicle. Incident to the pressure springs 21 and 22 bearing on the ball heads of the short rods 15 no violent motion is imparted to the lamp housings during the turning thereof.

If desired and as illustrated by Figure 9 of the drawings, the lamp housings may be pivotally connected, as at 47, to the upper members or sections 5 of the lamp posts or supports.

My improvement is of a comparatively simple nature and may be easily attached to any type of automobiles. The advantages of the improvement will, it is thought, be perfectly apparent to those skilled in the art to which the invention relates, it being obvious that the auxiliary or spot lamps 4 may be successfully employed in combination or connection with the ordinary head lamps and that the bulbs of the latter may be at all times retained dimmed. The operating handle 45 incident to the frictional engagement of the spring 46 with the segment 44 prevents the device being accidentally operated, but the lamps may be easily and quickly turned to any desired angle in a horizontal plane by a slight manipulation of the handle. The improvement is, of course, not to be restricted to the precise detains as herein set forth as I hold myself entitled to make such changes therefrom as fairly fall within the scope of what I claim.

Having described the invention, I claim:—

The combination with an automobile and a lamp housing therefor, of a fixed angle bracket, a post for the lamp housing comprising an upper section which is fixed to the housing and a lower section which rests on the horizontal arm of the angle bracket, said lower section having a bolt extension passing through the said arm of the bracket and which bolt extension is engaged by a nut, a stud extension on the upper section entering the lower section, and having an annular depression therein, a bolt member screwed in the lower section and received in the annular depression, said post sections having their confronting ends formed with annular grooves which are arranged concentric with respect to the stud and which provide raceways for anti-frictional balls, a rod having a headed end fixed to the upper post section, a slidable member loosely connected to the end of the rod and an operating element for imparting a longitudinal movement to the slidable member comprising a cranked rod which is journaled in bearings along the sides of the automobile frame and an operating lever for the cranked rod.

In testimony whereof I affix my signature.

ERNEST O. BENNETT.